INVENTOR.
Theodore F. Peters
BY
Donald P. Selecki
HIS ATTORNEY

United States Patent Office 3,312,314
Patented Apr. 4, 1967

3,312,314
VEHICLE DIFFERENTIAL BRAKE CONTROL
Theodore F. Peters, Utica, Mich., assignor to General Motors Corporation, Detroit, Mich., a corporation of Delaware
Filed June 28, 1965, Ser. No. 467,481
1 Claim. (Cl. 188—152)

This invention relates to vehicle brake control mechanisms and more particularly to apparatus which maintains a selected wheel brake energized while other vehicle brakes are released.

It is desirable at certain times during operation of motor vehicles to have a vehicle differential control. Automobile differentials of common design generally direct locomotive force to vehicle wheels offering the least resistance to rotation. This is particularly important when a vehicle is making a turn and wheels mounted substantially on the same axle rotate at different speeds during the turn. However, occasions arise when one wheel is on a non-tractive surface, for example, mud or snow, and another wheel is on a tractive surface. On vehicles equipped with a conventional differential, the locomotive force will be directed toward the wheel offering the least resistance to rotation, i.e., the wheel in the mud or snow. Under these conditions of operation, it is desirable to completely brake the wheel that is on the non-tractive surface, thereby providing it with a greater resistance to rotation than a wheel on a tractive surface. The vehicle locomotive force is then directed toward the wheel which offers less resistance to rotation moving the vehicle forward while the wheel on the non-tractive surface is pulled along in non-rotatable fashion.

It is an object of the present invention to provide a very simple mechanism for holding a selected vehicle's wheel brake energized while the other vehicle wheel brakes are released.

It is another object of the present invention to provide an improved brake control mechanism which is operable in response to a force producing device to lock a brake applied force on a given wheel after the vehicle's wheel brakes are deenergized.

It is still another object of the present invention to provide an improved vehicle brake control mechanism which mechanically holds a mechanically actuated brake in actuated condition.

Further objects and advantages of the present invention will be apparent from the following description, reference being had to the accompanying drawings wherein preferred embodiments of the present invention are clearly shown.

Figure 1:
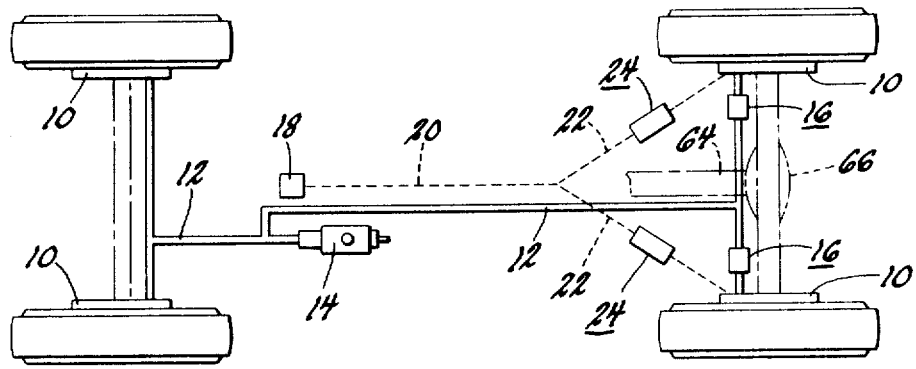
FIGURE 1 is a diagrammatic illustration of a vehicle braking system with the subject invention shown in its operative environment.

Referring to FIGURE 1, vehicle wheel brakes 10 are energized through lines 12 from a conventional hydraulic master cylinder 14. A brake control mechanism 16 in accordance with the subject invention is illustrated in a typical position it would assume in the vehicle braking system when utilized with hydraulic brakes.

An emergency brake system is diagrammatically shown in FIGURE 1 wherein an actuator means 18, typically a pedal or a lever, is arranged to pull cable 20 and cables 22 which are operatively connected to vehicle brakes 10 to mechanically actuate said brakes. Another embodiment 24 of the brake control mechanism 16 is shown in a typical mounted position relative to brakes 10.

Figure 2:
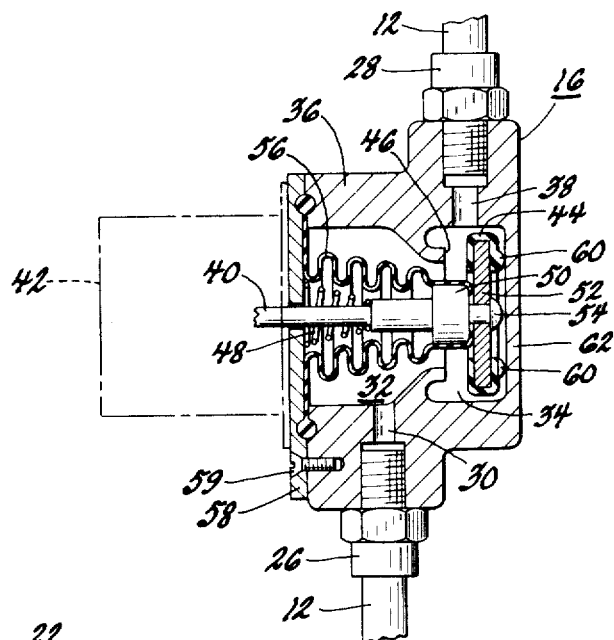
FIGURE 2 is a sectional view of one embodiment of the subject invention shown in FIGURE 1.

Referring to FIGURE 2, brake control mechanism, generally designated by numeral 16, is illustrated as being positioned in line 12 at a point between the master cylinder 14 and brakes 10. Both of the brake control mechanisms 16 shown in FIGURE 1 are identical and it is understood that the function of both is the same.

Inlet 26 is designated as the side of the brake control mechanism 16 nearest master cylinder 14 and outlet 28 is on the side of the brake control mechanism 16 nearest brakes 10. The designation of an inlet and an outlet is for explanation purposes alone, it being understood that the subject device works equally as well with the inlet and outlet reversed. Inlet 26 communicates fluid to passage 30 and eventually to chamber 32. Chamber 34 is formed in another portion of valve body 36 and is normally in free fluid communication with chamber 32. It is seen in FIGURE 2 that chamber 34 is always in free fluid communication with outlet 28 through passage 38.

Drive rod 40 linearly movable in response to a force producing means, generally designated by numeral 42, is arranged to carry resilient member 44 into sealing relation with seat 46. Force producing means 42 can take many forms, such as an hydraulic servo motor, a vacuum servo motor, an electrical relay, or a bell crank type lever actuator, the only requirement being that rod 40 be drawn to the left, as viewed in FIGURE 2, against the bias of spring 48 so that resilient member 44 will be drawn into sealing engagement with seat 46, thereby isolating inlet 26 from outlet 28. Drive rod 40 can take any well-known form but, as shown in FIGURE 2, includes an integrally formed support member 50 carrying support 52 for resilient member 44 that is firmly attached to support member 50 by rivet 54. Resilient diaphragm type seal 56 engages rod 40 by being pressed during assembly between support 52 and support 50 and at another terminus by being pressed between cover 58 and valve body 36 by screws 59. Nipples 60, formed on an opposite side of member 44 from the side engaging seat 46, serve to separate member 44 from wall 62 of valve body 36 during periods of operation when brake control mechanism 16 is poised for operation.

In operation, it will be assumed that one of the driving wheels of the vehicle on which the subject device is carried is located on a non-tractive surface, such as snow, and the opposite driving wheel is located on a tractive surface. Normally, on a vehicle not equipped with the subject invention, the wheel on the non-tractive surface will spin because all of the locomotive force of the vehicle from drive shaft 64 is transmitted through differential 66 to the wheel offering the least resistance to rotation. In this situation, on a vehicle equipped with the subject invention, the vehicle operator would actuate force producing means 42 in any well-known manner, such as by pushing a button or pulling a lever after a braking force was applied to brakes 10. This would lock hydraulic pressure between brake control mechanism 16, that was previously actuated, and appropriate brake 10. When the braking force on the vehicle was relieved, the wheel brake whose pressure was trapped will remain energized leaving the remaining wheels free for rotation. The energization of brake control mechanism 16 comes about by drawing drive rod 40 to the left, as viewed in FIGURE 2, until resilient member 44 firmly engages seat 46. Thereafter, when pressure is relieved at inlet 26 from master cylinder 14, the pressure in chamber 34 will remain unrelieved due to the lack of a relief path past seated resilient member 44. Pressure will remain at outlet 28 and the selected brake 10 remains in an energized state.

Power is then applied to drive shaft 64 through differential 66 which in a conventional manner, applies locomotive force to the vehicle by turning the wheel offering the least resistance to rotation. The braked wheel offers relatively greater resistance to rotation than the wheel on the tractive surface and the vehicle will move forward until the braked wheel is clear of the non-tractive surface.

Deenergization of the locked brake is brought about by relieving the force from the force producing means 42, allowing spring 48 to become the dominant force acting on drive rod 40. Resilient member 44 will then be moved from seat 46 allowing the pressure trapped in chamber 34 to equalize with unpressurized chamber 32.

Figure 3:
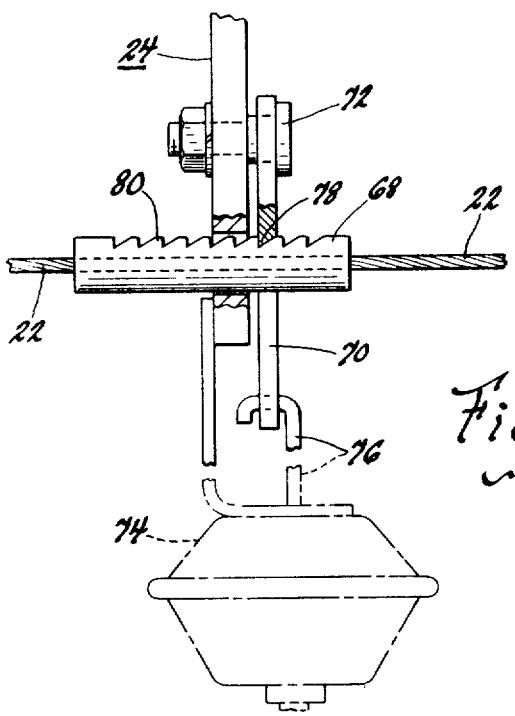
FIGURE 3 is an elevational view of another embodiment of the subject invention illustrated in FIGURE 1.

Another embodiment of the present invention is illustrated in FIGURE 3 and is adapted for an emergency brake system that involves mechanical actuation of brakes 10. Cable 20 is adapted to be drawn forward toward actuator means 18 by any well-known means, such as a lever. Cable 20 terminates in a Y which engages a pair of cables 22 in turn engaging brakes 10 of the vehicle driving wheels. Each of the brake control mechanisms of the second embodiment carried by cables 22 is identical and the explanation following is applicable to either.

Ratchet 68 is carried by cable 22 and adapted to move therewith. Pawl member 70 is pivotable on pivot pin 72 in response to movement of actuator 74. Actuator 74 has an output rod 76 engaging pawl 70 to bring portion 78 of pawl 70 in and out of engagement with teeth 80 of ratchet 68. Actuator 74 in the example shown is a vacuum servo motor but it is understood that any servo motor that is capable of moving output rod 76 in two directions in order to pivot pawl 70 is suitable for use with this invention.

Similar to the situation previously described, it is assumed that one of the driving wheels of the vehicle is situated on a non-tractive surface and another driving wheel is on a tractive surface. Actuator means 18 is energized drawing cable 20 forward causing cables 22 engaging brakes 10 to put pressure thereon mechanically, causing a brake actuation on the driving wheels of the vehicle. Thereafter, actuator 74 is energized in any well-known fashion, for example, by energizing a vacuum valve located in the driving compartment of the vehicle. It is understood that actuator 24 carried by the cable to the wheel on the non-tractive surface is the one energized. Output rod 76 would be typically drawn into actuator 74, thereby pivoting pawl 70 and portion 78 into teeth 80 of ratchet 68. This would prevent relative movement between ratchet 68 and pawl 70 in one direction, thereby preventing deenergization of the parking brake to the affected wheel. Actuator means 18 would then release tension on cable 20 in turn relieving the force through cable 22 on which deenergized brake control mechanism 24 is located. The braking force would be relieved at the unaffected brake 10 leaving that wheel free for rotation. The selected brake 10 would remain energized and the associated wheel would be non-rotatable.

With the wheel on the non-tractive surface braked, power can then be directed through drive shaft 64 and differential 66 to the non-braked wheel allowing the vehicle to move forward until the brake wheel is clear of the non-tractive surface. When the non-tractive surface is cleared, the operation of the actuator 74 is reversed either by spring means or by reversely applying force thereon bringing pawl 70 out of engagement with ratchet 68. The holding force on cable 22 is thereby relieved and the locked wheel is freed for rotation.

The utility of the subject device in either embodiment is apparent as a differential wheel control bringing about essentially the same result as much more expensive and intricate control type differentials. The subject mechanism is adapted for use either with the conventional braking system, as illustrated by the embodiment in FIGURE 2, or is adapted for use with mechanically actuated parking brake systems, such as illustrated in the embodiment of FIGURE 3. Utility of the subject device is extended by the simplicity of the subject invention and the fact that it is readily utilized on vehicle braking systems of common design.

While the embodiments of the present invention, as herein disclosed, constitute preferred forms, it is to be understood that other forms might be adopted.

What is claimed is as follows:

In a vehicle braking system a control differential unit including valve means for selectively shutting off brake pressure to vehicle wheels which are to be used as driving wheels, said valve comprising: a valve body having a main body portion and a cover attached to an opening thereof to form a closed structure; an inlet from a master cylinder into said body and an outlet to vehicle wheel brakes from said body; shiftable means slidably disposed within said body in a disposition bringing about an isolation of said inlet from said outlet when shifted to an extreme of movement in response to an input force; and elastomeric means surrounding said shiftable means and having terminal portions, a first of said terminal portions forming an O-ring seal for the terminus of said main valve body portion and the cover for said valve body, and a second terminal portion forming a seat on said shiftable means for engagement with another portion of said valve body, said elastomeric means including raised portions of substantially mound shape in spaced apart relationship providing a point contact with said valve body for maintaining a predetermined spaced relationship between said shiftable means and said valve body while said shiftable means is in a normal position of rest.

References Cited by the Examiner

UNITED STATES PATENTS

| | | | |
|---|---|---|---|
| 1,399,591 | 12/1921 | Uffert | 188—265 X |
| 1,771,410 | 7/1930 | Stewart | 251—331 X |
| 2,076,532 | 4/1937 | Francoeu et al. | 188—265 |
| 2,289,563 | 7/1942 | Wood et al. | 188—152 |
| 2,466,837 | 4/1949 | Bohr | 188—152 X |
| 3,083,943 | 4/1963 | Stewart | 251—331 |
| 3,143,192 | 8/1964 | Buchanan | 188—265 X |
| 3,154,288 | 10/1964 | Tripoli | 251—331 |

FOREIGN PATENTS

| | | |
|---|---|---|
| 1,231,512 | 4/1960 | France. |

MILTON BUCHLER, *Primary Examiner.*

G. E. A. HALVOSA, *Assistant Examiner.*